United States Patent
Schaenzer et al.

[11] Patent Number: 5,872,311
[45] Date of Patent: Feb. 16, 1999

[54] INTEGRATED PIEZOELECTRIC AND THERMAL ASPERITY TRANSDUCERS FOR TESTING DISC MEDIA IN HIGH PERFORMANCE DISC DRIVES

[75] Inventors: Mark J. Schaenzer, Eagan; Beat G. Keel, Prior Lake; Zine-Eddine Boutaghou, Vadnais Heights; Subrahmanyan Nagarajan, Burnsville, all of Minn.

[73] Assignee: Seagate Technology, Inc., Scotts Valley, Calif.

[21] Appl. No.: 839,992

[22] Filed: Apr. 24, 1997

Related U.S. Application Data

[60] Provisional application No. 60/030,551, Nov. 3, 1996.
[51] Int. Cl.$^6$ .............................. G01B 7/34; G01B 21/30
[52] U.S. Cl. ............................................................. 73/105
[58] Field of Search ........................ 73/105; 29/603.01, 29/603.07, 603.13, 603.18; 360/113; 365/157, 158

[56] References Cited

PUBLICATIONS

Article entitled "High Frequency Slider Vibrations During Asperity Impacts in Rigid Magnetic Disk Systems" by J.C. Briggs et al., *Adv. Info. Storage Syst.*, vol. 4, 1992, pp. 181–194.

*Primary Examiner*—Daniel S. Larkin
*Attorney, Agent, or Firm*—Kinney & Lange, P.A.

[57] ABSTRACT

A device for testing smoothness of a rotatable disc is disclosed. A slider body has a trailing edge surface and an air-bearing surface for gliding over a surface of the disc when the disc is rotating. A piezoelectric sensor is formed in the slider body, and a thermal asperity sensor is formed in the slider body and at least partially exposed to the air-bearing surface. A plurality of conductive vias extend from the trailing edge surface of the slider body into the slider body to contact the piezoelectric and thermal asperity sensors. A plurality of conductive bond pads are disposed on the trailing edge surface in contact with respective conductive vias.

6 Claims, 4 Drawing Sheets

INTEGRATED PIEZOELECTRIC AND THERMAL ASPERITY TRANSDUCERS FOR TESTING DISC MEDIA IN HIGH PERFORMANCE DISC DRIVES

CROSS-REFERENCE TO RELATED APPLICATIONS

This application claims priority from Provisional Application No. 60/030,551 filed Nov. 13, 1996 for "Integrated Piezoelectric and Thermal Asperity Transducers for Certifying Disc Media for High Performance Disc Drives" by M. Schaenzer, B. Keel, Z. Boutaghou and S. Nagarajan.

BACKGROUND OF THE INVENTION

The present invention relates to a test slider for testing the smoothness of a disc in a disc drive system, and more particularly relates to an integrated piezoelectric and magnetoresistive (MR) thermal asperity transducer slider to concurrently detect defects in a magnetic disc.

In order to certify that a magnetic disc is adequately smooth for use in a disc drive system, tests must be performed on the disc. One type of testing is performed by utilizing a test slider having a piezoelectric element bonded thereon. When any part of the slider contacts a protrusion on the surface of the disc, the slider will vibrate from the impact. The piezoelectric element bonded on the slider senses these vibration forces acting on the slider, exhibiting a voltage between its terminals representative of the forces experienced by the element. If the vibration force sensed by the piezoelectric element exceeds a predetermined design level, or if vibration occurrences exceed a predetermined design frequency, then the disc media under test is not adequately smooth to be used in applications.

There are several problems involved with utilizing piezoelectric test sliders to test the smoothness of a disc. By bonding the piezoelectric element to the slider, the piezoelectric element loses some of its sensitivity to forces acting on the slider, since some of these forces may be absorbed through the bond to the piezoelectric element. Piezoelectric test sliders are therefore relatively insensitive to narrow defects and asperities in the disc being tested. In addition, the process of bonding a piezoelectric element to the slider affects the aerodynamic characteristics of the slider, which are desirably tightly controlled. Finally, the process of assembling a piezoelectric element on a slider is a tedious and expensive undertaking, and is not standard since piezoelectric elements are not employed on actual read/write heads. Changes in the process of manufacturing the slider must be made, which makes manufacturing test sliders less efficient.

Another type of testing is performed by equipping a test slider with thermal asperity sensor, such as a MR transducer. A thermal change occurs in the sensor upon detecting a defect or asperity in the disc at the transducer, which changes the resistance of the MR element and thereby indicates the presence of a defect on the disc. The defect or asperity may be a depression or a rise (bump) in the disc surface, as each affects the resistance characteristics of the MR element oppositely. However, if the transducer (which is positioned on a rail at the trailing edge of the slider) does not directly confront the defect on the disc, the MR sensor is unable to detect the presence of the defect. Thus, for wide defects, the slider may "bounce" over the defect after contacting it near the leading edge of the slider, the force of which would affect the height of the thermal asperity sensor over the surface of the disc and thereby cause errors in detecting the defect.

One solution to the problems presented in testing the smoothness of a disc has been to perform two separate glide tests, one with a piezoelectric test slider and one with a separate thermal asperity test slider. The piezoelectric slider is used for best performance in detecting "short and fat" defects on the disc, while the thermal asperity slider is used for best performance in detecting "tall and thin" defects in the disc.

However, additional problems are presented by using separate piezoelectric test sliders and thermal asperity test sliders. Greater time and effort is involved in performing two separate tests. Also, the potential for inaccuracies in measurements is present, since the piezoelectric test slider may not have identical flying characteristics as the MR test slider.

There is a need in the art for an integrated thermal asperity and piezoelectric sensing device to allow testing of disc smoothness with a single test slider that is simply designed and provides reliable measurements.

SUMMARY OF THE INVENTION

The present invention is a device for testing smoothness of a rotatable disc. The device includes a slider body, and is operable to glide over a surface of the disc. A piezoelectric sensor and a thermal asperity sensor are carried by the slider body, and each measures characteristics indicative of the smoothness of the rotatable disc. The piezoelectric sensor and the thermal asperity sensor are preferably formed in the slider body, and the thermal asperity sensor is preferably at least partially exposed to an airbearing surface of the slider body.

According to one aspect of the invention, a plurality of conductive vias extend from a trailing edge surface of the slider body into the slider body to contact the piezoelectric sensor and the thermal asperity sensor. A plurality of conductive bond pads are disposed on the trailing edge surface in contact with respective conductive vias.

A further aspect of the invention is a method of constructing a device for testing smoothness of a rotatable disc. A slider having an airbearing surface is formed, and a first conductive layer is formed on the slider. A piezoelectric layer is formed on the first conductive layer, and a via is etched through the piezoelectric layer to the first conductive layer. Upper and lower contacts are formed on the piezoelectric layer, the lower contact being spaced from the upper contact and connected through the via to the first conductive layer. A first layer of insulating material is formed to at least partially encapsulate the conductive layer, piezoelectric layer, and upper and lower contacts. A thermal asperity sensor is formed on the first layer of insulating material, and has at least two terminals. A second layer of insulating material is formed over the thermal asperity sensor to at least partially encapsulate the thermal asperity sensor. Vias are etched through the first and second layers of insulating material to the upper and lower contacts and the terminals of the thermal asperity sensor. Conductive material is formed in the vias, and conductive bond pads are formed on a top surface of the second insulating layer in contact with the conductive material in the vias.

DETAILED DESCRIPTION OF THE PREFERRED EMBODIMENTS

Figure 1:
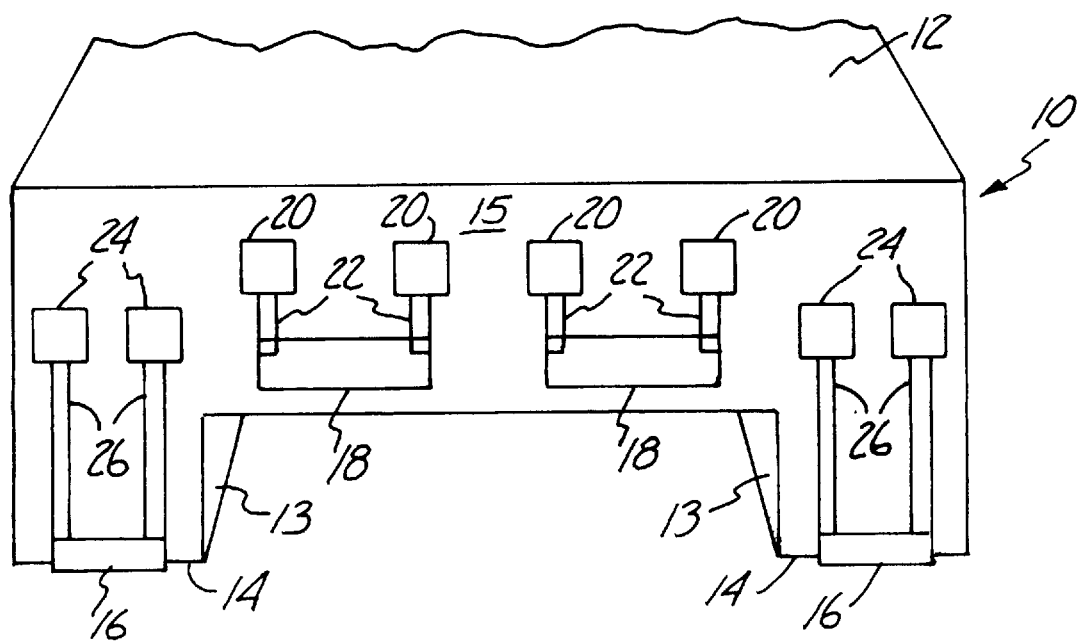
FIG. 1 is a conceptual illustration of the rear of a test slider according to the present invention.

FIG. 1 is a conceptual illustration showing a rear of a test slider 10 according to the present invention. Test slider 10 includes a slider body 12 having rails 13 forming air-bearing surface 14. Thermal asperity sensors 16 are disposed on trailing surface 15 in the slider body and are exposed to air-bearing surface 14. Piezoelectric sensors 18 are embedded in slider body 12, preferably not exposed to air-bearing surface 14. Bond pads 20 and 24 are disposed on trailing surface 15. Piezoelectric elements 18 are connected to bond pads 20 by conductive vias 22, and thermal asperity sensors 16 are connected to bond pads 24 by conductive vias 26. Thermal asperity sensors 16 and piezoelectric sensors 18 are preferably not exposed at trailing surface 15, and are preferably encapsulated in an insulating material, with a design as is known in the art. Slider body 12 may also be constructed of the insulating material. Air-bearing surface 14 is positioned in operation a small distance from the surface of a rotating disc, as is known in the art. Thermal asperity sensors 16 and piezoelectric sensors 18 are preferably formed on a substrate wafer; their design is shown in more detail in FIGS. 2A–2G. Bond pads 20 and 24 are composed of a conductive material such as gold or copper, as is known in the art.

In operation, slider body 12 glides such that air-bearing surface 14 is a small distance over the surface of the rotating disc under test. Thermal asperity sensors 16 and piezoelectric sensors 18 detect defects in the disc surface. Test circuitry (not shown) is operatively coupled to thermal asperity sensors 16 and piezoelectric sensors 18 through wires attached between the test circuitry and bond pads 20 and 24. FIG. 1 shows test slider 10 with two thermal asperity sensors 16, and two piezoelectric sensors 18. As few as one of each sensor, and numbers greater than two of each sensor may be used in alternative embodiments of the invention.

FIGS. 2A–2G illustrate the process of forming piezoelectric sensors 18 and thermal asperity sensors 16 on a wafer according to an aspect of the present invention. A conductive layer 32 is formed on wafer substrate 30. The wafer substrate may, for example, be a portion of the slider body. Conductive layer 32 is recessed from surface 51 of substrate 30; as will become apparent, surface 51 forms part of the trailing portion of the air-bearing surface of the slider rail(s). A layer of piezoelectric material 34 is deposited on conductive layer 32, and via 36 is etched through piezoelectric layer 34 to conductive layer 32. Upper conductive contact 38 and lower conductive contact 40 are deposited on piezoelectric layer 34, also filling via 36 to conductive layer 32, thereby forming a conductive path between lower contact 40 and conductive layer 32. Upper contact 38 and lower contact 40 are spaced apart, leaving an exposed region of piezoelectric layer 34 between them. An insulating layer 42 is formed around the piezoelectric sensor, thereby encapsulating the piezoelectric sensor.

Figure 2A:
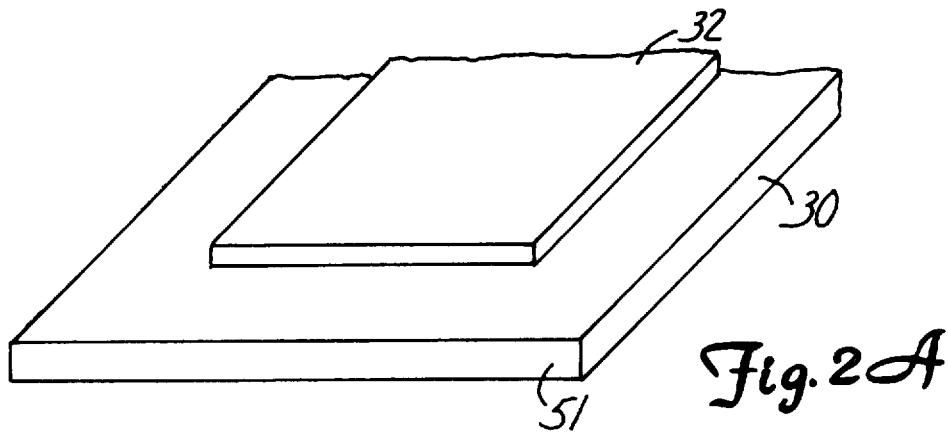
FIGS. 2A–2G illustrate a process of forming an integrated test slider of the present invention.
Figure 2B:
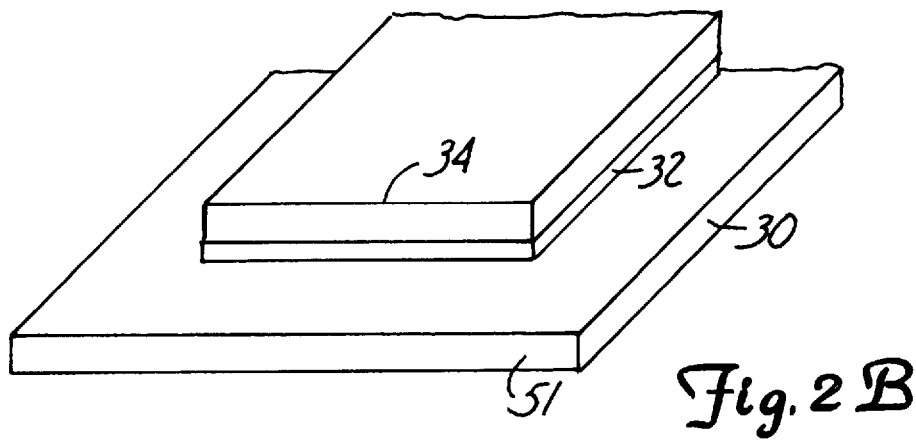
Figure 2C:
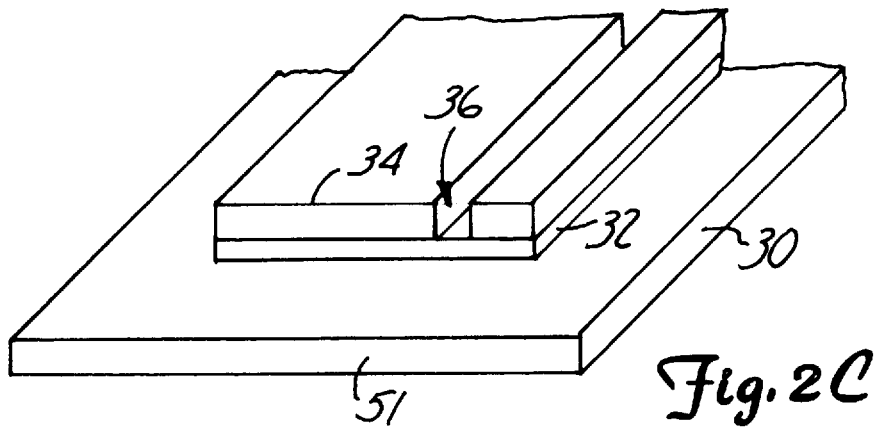
Figure 2D:
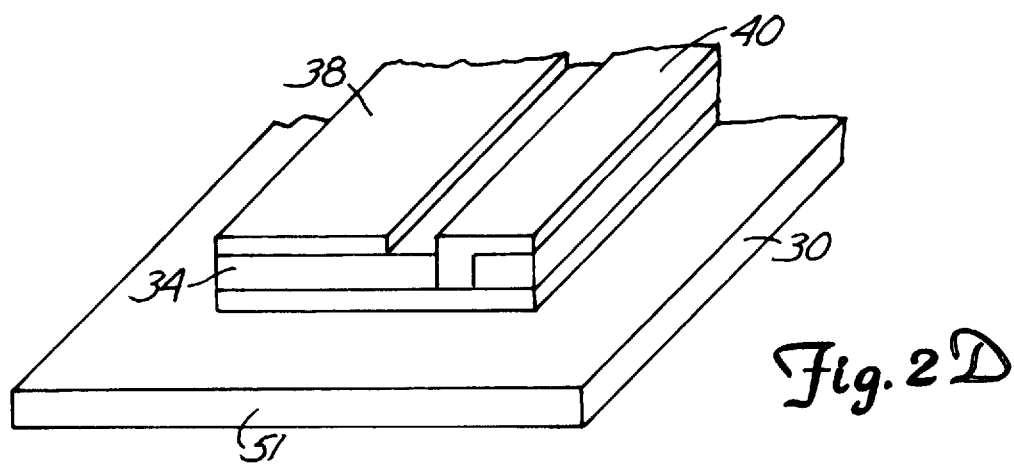
Figure 2E:
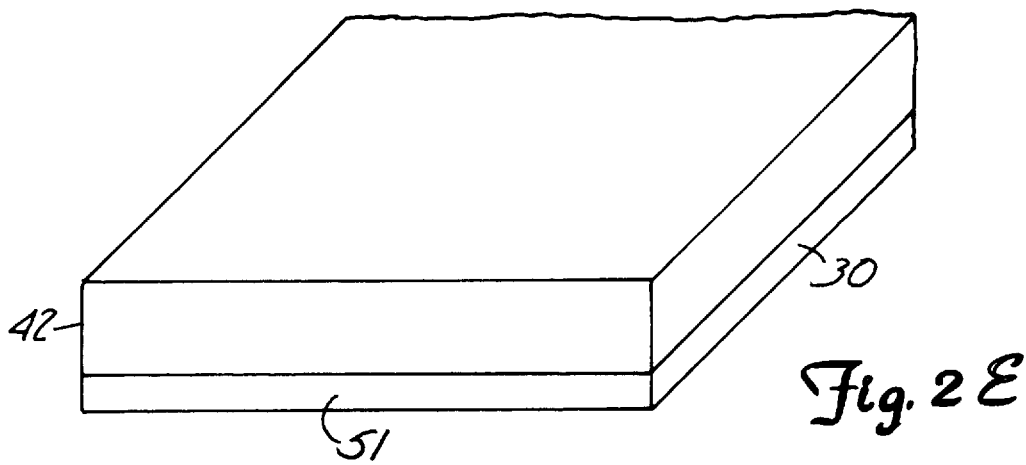
Figure 2F:
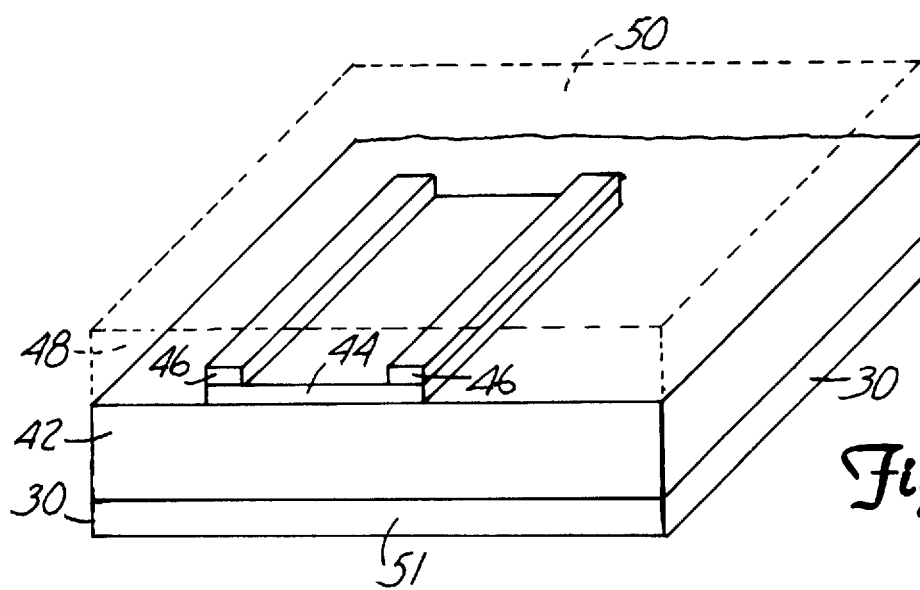
Figure 2G:
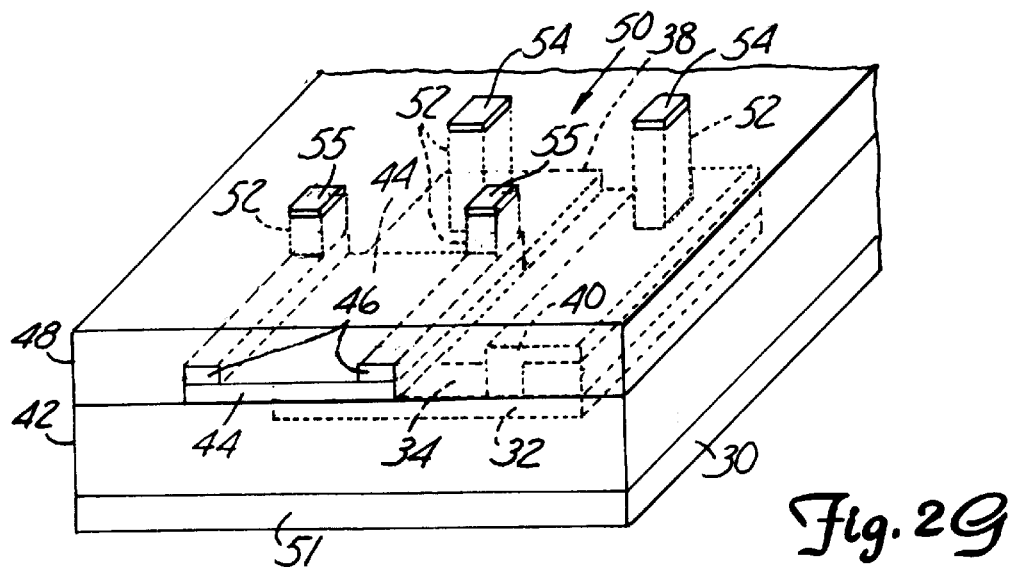

A thermal asperity sensor is formed on the top surface of insulating layer 42. Specifically, magnetoresistive (MR) element 44, with conductive terminals 46, is deposited on insulation layer 42. Preferably, MR layer 44 is flush with air-bearing surface 51, and MR layer 44 and terminals 46 preferably do not extend as far into the slider body toward the top of the slider as do the layers of the piezoelectric sensor. Hence, MR element 44 is exposed at air-bearing surface 51 of the slider. As shown in FIG. 2G, the thermal asperity sensor is covered by second insulation layer 48, the top surface of which is the trailing edge surface 50 of the slider body. Conductive vias 52 are formed through second insulation layer 48 to contact terminals 46 of the thermal asperity sensor, and are formed through both second insulation layer 48 and first insulation layer 42 to contact upper contact 38 and lower contact 40 of the piezoelectric sensor. Bond pad terminals 54 are disposed on trailing edge surface 50 of the slider body, over conductive vias 52 extending to the piezoelectric sensor. Bond pad terminals 55 are disposed on trailing edge 50 of the slider body, over conductive vias 52 extending to the thermal asperity sensor. Bond pads 54 and 55 provide a connection point for test circuitry wires (not shown) to receive information from the piezoelectric sensor and the thermal asperity sensor.

FIGS. 2A–2G show the process of forming one thermal asperity sensor and one piezoelectric sensor, in a vertically aligned configuration. Multiple piezoelectric sensors and thermal asperity sensors may be formed by simply repeating the process shown in FIGS. 2A–2G on adjacent portions of the same wafer or on multiple wafers. The thermal asperity sensor and the piezoelectric sensor need not necessarily be vertically aligned. The exact configuration of the sensors can be adapted to particular slider body designs, and to optimize the performance of each of the sensors.

Figure 3:
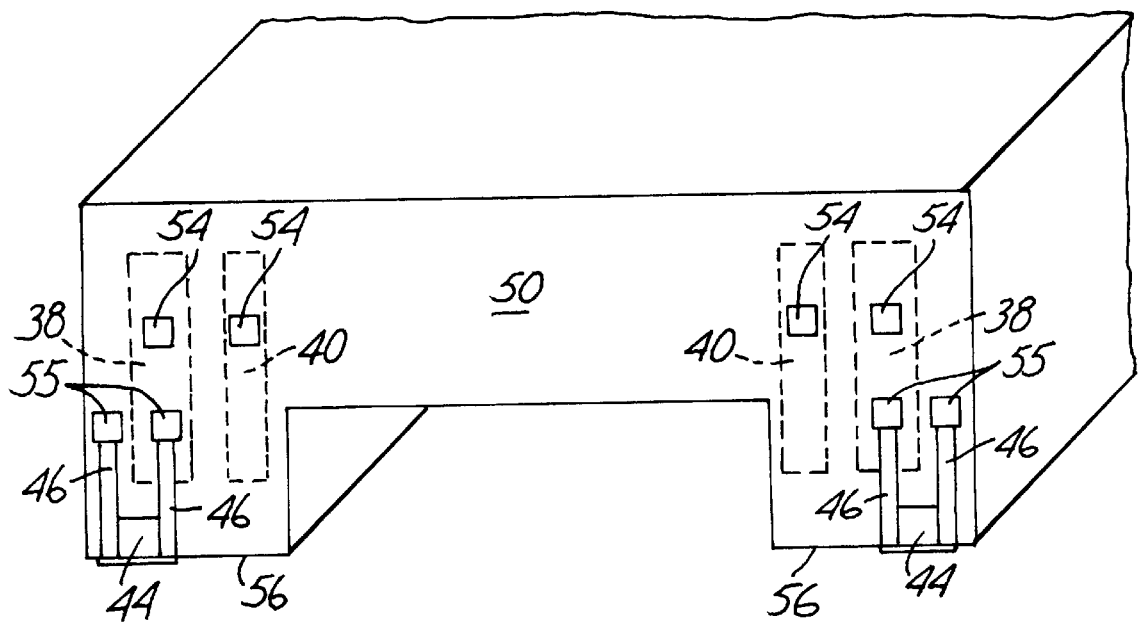
FIG. 3 is a conceptual illustration showing the integrated test slider constructed as shown in FIGS. 2A–2G.

FIG. 3 conceptually illustrates a rear of a test slider having thermal asperity sensors and piezoelectric sensors implemented according to the process shown in FIGS. 2A–2G. The sensors are shown as elongated to more clearly illustrate the spatial relationship between them. The thermal asperity sensors are shown in solid lines, and the piezoelectric sensors are shown in phantom lines, to distinguish between them and to illustrate how the piezoelectric sensors are further recessed from the trailing edge surface than the thermal asperity sensors. Preferably, all of the sensors are positioned so that they are not exposed at trailing surface 50.

For the piezoelectric sensors, bond pads 54 connect to upper contact 38 and lower contact 40 by vias extending normal to trailing surface 50 through the slider body. Bond pads 54 are disposed on trailing edge surface 50. The piezoelectric sensors are embedded in the slider body so that they are not exposed at air-bearing surface 56.

For the thermal asperity sensors, bond pads 55 connect to terminals 46 of MR element 44 by vias extending normal to trailing surface 50 through the slider body. Bond pads 55 are disposed on trailing edge surface 50. MR element 44 is located so that it is at least partially exposed at air-bearing surface 56.

The present invention provides an integrated thermal asperity and piezoelectric sensing device, operable to test the smoothness of a rotating disc. The device is implemented as a single test slider, is simply designed, and provides reliable measurements.

Although the present invention has been described with reference to preferred embodiments, workers skilled in the art will recognize that changes may be made in form and detail without departing from the spirit and scope of the invention.

What is claimed is:

1. A device for testing smoothness of a rotatable disc, the device being operable to glide over a surface of the disc and comprising;

a slider body;

a piezoelectric sensor carried by the slider body, the piezoelectric sensor being responsive to vibrations from contact with aprotrusion on the disc to measure characteristics indicative of the smoothness of the rotatable disc; and a thermal asperity sensor carried by the slider body, the thermal asperity sensor being responsive to thermal changes due to confronting a defect on the disc to measure characteristics indicative of the smoothness of the rotatable disc.

2. A device for testing smoothness of a rotatable disc, the device comprising:

a slider body having a trailing edge surface and an air-bearing surface for gliding over a surface of the disc when the disc is rotating;

a piezoelectric sensor formed in the slider body;

a thermal asperity sensor formed in the slider body and at least partially exposed to the air-bearing surface;

a plurality of conductive vias extending from the trailing edge surface of the slider body into the slider body to contact the piezoelectric sensor and the thermal asperity sensor; and a plurality of conductive bond pads on the trailing edge surface in contact with respective conductive vias.

3. The device of claim 2, wherein the piezoelectric sensor comprises:

a first conductive layer in the slider body, the first conductive layer having a surface normal to and recessed from the air-bearing surface;

a piezoelectric layer formed on the first conductive layer;

a via extending through the piezoelectric layer to the first conductive layer; and a second conductive layer formed on the piezoelectric layer and in the via to form an upper contact and a lower contact, the lower contact being spaced from the upper contact and connected through the via to the first conductive layer.

4. The device of claim 2, wherein the thermal asperity sensor comprises a magnetoresistive element in the slider body normal to and at least partially exposed to the air-bearing surface of the slider body, the magnetoresistive element including at least two terminals.

5. The device of claim 2, wherein the slider body includes a first insulating layer at least partially encapsulating the piezoelectric sensor and a second insulating layer at least partially encapsulating the thermal asperity sensor.

6. A method of constructing a device for testing smoothness of a rotatable disc, the method comprising:

forming a slider having an air-bearing surface;

forming a first conductive layer on the slider on a surface normal to and recessed from the air-bearing surface;

forming a piezoelectric layer on the first conductive layer;

etching a via through the piezoelectric element to the first conductive layer;

forming a second conductive layer on the piezoelectric layer and in the via to form an upper contact and a lower contact, the lower contact being spaced from the upper contact and connected through the via to the first conductive layer;

forming a first layer of insulating material on the second conductive layer, the piezoelectric element, and the surface on which the first conductive layer is formed, the first layer of insulating material having a top surface normal to the air-bearing surface;

forming a thermal asperity sensor on the first layer of insulating material, the thermal asperity sensor having at least two terminals;

forming a second layer of insulating material over the thermal asperity sensor and the first layer of insulating material;

etching vias through the first and second layers of insulating material to the upper and lower contacts;

etching vias through the second layer of insulating material to the terminals of the thermal asperity sensor;

forming conductive material in the vias through the first and second insulating layers to the upper and lower contacts and to the terminals of the thermal asperity sensor; and forming conductive bond pads in contact with the conductive material in the vias on a top surface of the second layer of insulating material normal to the air-bearing surface, the top surface of the second insulating layer normal to the air-bearing surface forming a trailing edge surface of the slider.

* * * * *

UNITED STATES PATENT AND TRADEMARK OFFICE
CERTIFICATE OF CORRECTION

PATENT NO. : 5,872,311
DATED : FEBRUARY 16, 1999
INVENTOR(S) : MARK J. SCHAENZER ET AL.

It is certified that error appears in the above-identified patent and that said Letters Patent is hereby corrected as shown below:

On the Title Page under [60], Provisional application no. 60/030,551, Nov. 3, 1996, delete "Nov. 3, 1996", insert --Nov. 13, 1996--

On the Title Page under [56] References Cited, insert --4,499,515 02/85, Piotrowski et al., 360/113;
5,640,089, 06/97, Horikawa et al., (filed 11 September 1995), 73/105 XR--

On the title Page under "PUBLICATIONS", insert --Brunsch et al., "Magnetic Read/Write Thin Film Head with Variable, Adjustable anisotropy ", IBM Technical Disclosure Bulletin, Vol. 21, No. 2, July 1978, pp. 667-668--

Signed and Sealed this

Ninth Day of May, 2000

*Attest:*

Q. TODD DICKINSON

*Attesting Officer*  *Director of Patents and Trademarks*